(12) United States Patent
Dandu et al.

(10) Patent No.: US 12,400,034 B2
(45) Date of Patent: Aug. 26, 2025

(54) PRESERVING USER PRIVACY IN CAPTURED CONTENT

(71) Applicant: Comcast Cable Communications, LLC, Philadelphia, PA (US)

(72) Inventors: Sravani Dandu, Santa Clara, CA (US); Muneem Shahriar, Sunnyvale, CA (US); Arun Ravisankar, Secane, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 274 days.

(21) Appl. No.: 18/192,217

(22) Filed: Mar. 29, 2023

(65) Prior Publication Data

US 2024/0330511 A1    Oct. 3, 2024

(51) Int. Cl.
*G06F 21/62* (2013.01)
*G06V 40/10* (2022.01)

(52) U.S. Cl.
CPC .......... *G06F 21/6254* (2013.01); *G06V 40/10* (2022.01)

(58) Field of Classification Search
CPC ............................ G06F 21/6254; G06V 40/10
See application file for complete search history.

(56) References Cited

U.S. PATENT DOCUMENTS

| | | | |
|---|---|---|---|
| 9,323,983 B2 | 4/2016 | Monnerat et al. | |
| 10,027,727 B1* | 7/2018 | Ozog | G06V 40/172 |
| 11,490,036 B1* | 11/2022 | Uavechanichkul | H04N 21/41407 |
| 2015/0070516 A1* | 3/2015 | Shoemake | H04N 21/4542 348/207.11 |
| 2015/0347823 A1* | 12/2015 | Monnerat | G06V 20/10 382/218 |
| 2017/0372046 A1* | 12/2017 | Thomee | H04L 63/0442 |
| 2019/0190916 A1* | 6/2019 | Owen | G06F 16/951 |
| 2020/0311424 A1* | 10/2020 | Mancuso | G06Q 30/0641 |
| 2023/0298226 A1* | 9/2023 | Kundu | G06T 7/10 345/156 |
| 2024/0219583 A1* | 7/2024 | Shill | G01S 19/49 |
| 2024/0233445 A1* | 7/2024 | Yau | G06F 21/6245 |
| 2024/0273234 A1* | 8/2024 | Horwitz | G06F 21/6245 |
| 2024/0288929 A1* | 8/2024 | Kölhi | H04W 8/20 |
| 2024/0298084 A9* | 9/2024 | Huang | H04N 23/66 |
| 2024/0310175 A1* | 9/2024 | Balsam | H04S 7/303 |
| 2024/0310988 A1* | 9/2024 | Bereza | G06T 19/20 |
| 2024/0333873 A1* | 10/2024 | Gehrmann | G06T 5/20 |
| 2024/0333874 A1* | 10/2024 | Gehrmann | G06T 5/20 |
| 2024/0346124 A1* | 10/2024 | Streit | G06V 40/45 |

(Continued)

*Primary Examiner* — Stephen T Gundry
(74) *Attorney, Agent, or Firm* — BakerHostetler

(57) ABSTRACT

Methods and systems for preserving user privacy in captured content are disclosed. A device may capture content in a location. A user located at or near the location may not want to be depicted in the content. The user may be associated with a user device comprising a privacy setting (e.g., an opted-out device). The opted-out device may receive content features associated with the content. The opted-out device may determine if the user is depicted in the content by comparing the content features to a local content feature stored on the opted-out device. If the content features correspond to the local content feature, the opted-out device may determine that the user is depicted in the content. The opted-out device may protect the privacy of the user by causing the device to obfuscate the identity of the user in the content.

20 Claims, 9 Drawing Sheets

(56) References Cited

U.S. PATENT DOCUMENTS

| | | | | |
|---|---|---|---|---|
| 2024/0348603 A1* | 10/2024 | Tussy | ............... | G06Q 20/40145 |
| 2024/0378277 A1* | 11/2024 | Chien | ................. | G06F 21/6218 |
| 2025/0030551 A1* | 1/2025 | Ott | .......................... | G06F 21/32 |

* cited by examiner

PRESERVING USER PRIVACY IN CAPTURED CONTENT

BACKGROUND

Devices may capture content at a variety of locations. The content may depict one or more individuals. However, not all of these individuals may want to be depicted in the content. Additionally, conventional approaches to preserving privacy make privacy tradeoffs that may be unacceptable to some users. Thus, there is a need for improved techniques to preserve user privacy in captured content.

SUMMARY

Methods and systems for preserving user privacy in captured content are disclosed. A user may capture an image in a public location with a device comprising a camera. Another user located at the public location may not want to be depicted in the image. The other user may be associated with a user device comprising a privacy setting (e.g., an opted-out device). The privacy setting may prevent the other user (e.g., the opted-out user) from being depicted in the image. The opted-out device may receive content features associated with the captured image from the device and/or from a server. The opted-out device may determine if the opted-out user is depicted in the image by comparing the content features to a local content feature stored on the opted-out device. If the content features correspond to the local content feature, the opted-out device may determine that the opted-out user is depicted in the image. The opted-out device may protect the privacy of the opted-out user by causing the device to obfuscate the identity of the opted-out user in the image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF ILLUSTRATIVE EMBODIMENTS

Methods and systems for preserving user privacy in captured content are disclosed. An increasing number of devices include devices configured to capture content (e.g., images and/or videos). A device may capture content at a location where one or more individuals (e.g., users) are present. A user may want to be captured in some content. For example, the user may be posing for the image or video. However, the user may not want to be captured in other content. For example, the user may not want their face to be depicted in images or videos taken without their permission or their voice to be depicted in videos taken without their permission.

To prevent the user from being depicted in content that he or she does not want to be depicted in, the user may enable a privacy setting on one or more user devices associated with the user. By enabling the privacy setting on the user device(s), the user may indicate that he or she does not want to be depicted in captured content without their permission. A user device that has enabled the privacy setting is referred to herein as an "opted-out user device." A user associated with an opted-out user device is referred to herein as an "opted-out user."

If a device is capturing content in a location, the device may cause sending of data to opted-out user device(s) located proximate to the location. The data may indicate one or more content features associated with the content being captured. The content features may comprise features (e.g., physical, vocal, etc.) associated with one or more individuals depicted in the content. Opted-out user device(s) located proximate to the location may receive the data. The opted-out user device(s) may determine if the content feature(s) indicated by the data correspond to at least a portion of a local content feature stored on that particular opted-out user device. The local content feature stored on a particular opted-out user device may comprise data indicating one or more features (e.g., physical features, vocal features, etc.) of the opted-out user(s) associated with that particular opted-out user device. If the content feature(s) correspond to at least a portion of the local content feature stored on a particular opted-out user device, this may indicate that an opted-out user associated with that opted-out user device is depicted in the content.

If an opted-out user associated with a particular opted-out user device is depicted in the content, that opted-out user device may cause an indication to be sent to the device. The indication may comprise an instruction for the device to modify at least a portion of the content. Modifying the at least a portion of the content may comprise obfuscating (e.g., blurring, removing, changing, and/or the like) the identity of the opted-out user in the content. Modifying the at least a portion of the content may prevent the opted-out user from being depicted at least in part in the content, thus preserving the privacy of the opted-out user.

Figure 1:
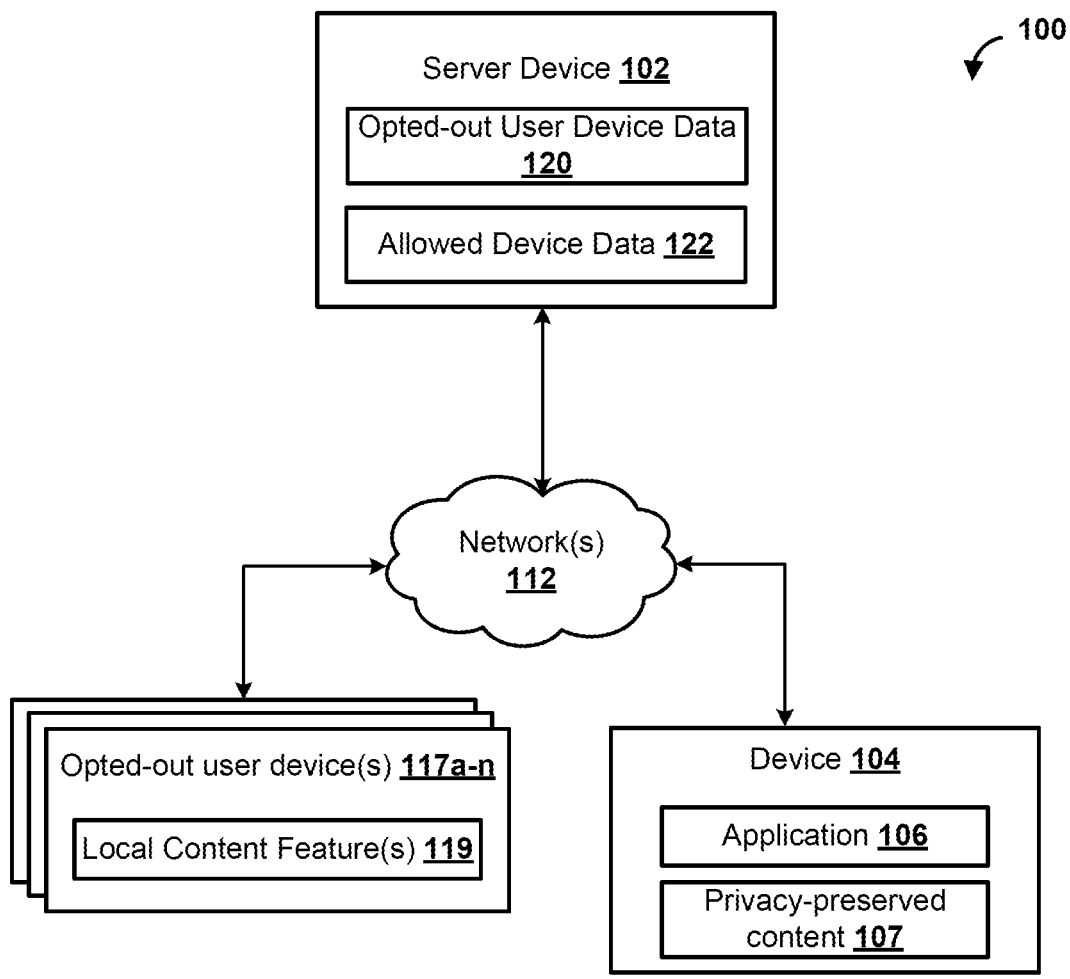
FIG. 1 is an example system for privacy preservation.

FIG. 1 is an example system 100 for privacy preservation. The system 100 may comprise one or more server device(s) 102, a device 104, a plurality of opted-out user devices 117a-n, or any combination thereof. It should be noted that while the singular term device is used herein, it is contemplated that some devices may be implemented as a single device or a plurality of devices (e.g., via load balancing). The server device(s) 102, the device 104, and the plurality of opted-out user devices 117a-n may each be implemented as one or more computing devices. Any device disclosed herein may be implemented using one or more computing nodes, such as virtual machines, executed on a single device and/or multiple devices.

The server device(s) 102, the device 104, and the plurality of opted-out user devices 117a-n may be communicatively coupled via one or more networks 112. The network(s) 112 may comprise a wide area network or a local area network. The network(s) 112 may comprise a content distribution and/or access network. The network(s) 112 may facilitate communication via one or more communication protocols. The network(s) 112 may comprise fiber, cable, a combination thereof. The network(s) 112 may comprise wired links, wireless links, a combination thereof, and/or the like. The network(s) 112 may comprise routers, switches, nodes, gateways, servers, modems, and/or the like.

The device 104 may be configured to capture content. The content may include images and/or videos. The device 104 may comprise one or more of a computing device, a camera device, a user device, a mobile device (e.g., mobile phone), a security camera, a smart device (e.g., smart glasses, smart watch, smart phone), a tablet, a computing station, a laptop, a television, and/or any other device configured to capture content. The device 104 may comprise an application 106. The application 106 may comprise a camera application. The application 106 may be configured to capture the content.

Each of the plurality of opted-out user devices 117*a-n* may be associated with one or more users who do not want to be depicted in captured content without their permission. The plurality of opted-out user devices 117*a-n* may be associated with an enabled privacy setting. The user(s) associated with each of the plurality of opted-out user devices 117*a-n* may have enabled, based on user input, the privacy setting. To enable the privacy setting, the user(s) may select (e.g., click) a toggle associated with the privacy setting. Based on receiving an indication that a user has selected the toggle associated with the privacy setting, the plurality of opted-out user devices 117*a-n* may cause the privacy setting to be enabled. A default setting associated with the plurality of opted-out user devices 117*a-n* may cause enablement of the privacy setting. If a default setting associated with the plurality of opted-out user devices 117*a-n* causes enablement of the privacy setting, the user(s) may not need to manually enable the privacy setting. The server device(s) 102 may store data indicating the plurality of opted-out user devices 117*a-n* as opted-out device data 120. By enabling the privacy setting on the plurality of opted-out user devices 117*a-n*, the user(s) may indicate that they do not want to be captured in content taken without their permission.

Each of the plurality of opted-out user devices 117*a-n* may be configured to store one or more local content features 119. The local content feature(s) 119 may comprise data indicating one or more features associated with one or more opted-out users. The local content feature(s) 119 may comprise facial landmark data. The local content feature(s) 119 may comprise data indicating facial features, physical features, vocal features, etc. associated with one or more opted-out users. The local content feature(s) 119 may comprise one or more of one or more vectors, a facial signature, or a machine model generated representation indicating the features associated with the one or more opted-out users.

The local content feature(s) 119 may not be accessible by any device other than the opted-out user device on which they are stored. The local content feature(s) 119 may not be accessible by the server device(s) 102. The local content feature(s) 119 may not be accessible by the device 104 and/or the application 106. The privacy of the opted-out users may be ensured by preventing other devices from accessing the local content feature(s) 119.

To generate the local content feature(s) 119, an opted-out user may capture raw data. The raw data may comprise raw image data and/or audio data. The opted-out user may capture the raw data using a camera and/or microphone associated with one of the plurality of opted-out user devices 117*a-n*. The opted-out user may be prompted to capture the raw data if the user enables the privacy setting. The raw data may be transformed into the local content feature(s) 119 using one or more machine learning algorithms. The machine learning algorithm(s) may be applied to the data to generate the local content feature(s) 119. A single opted-out user device of the plurality of opted-out user devices 117*a-n* may store local content feature(s) 119 associated with more than one opted-out user. For example, a single opted-out user device of the plurality of opted-out user devices 117*a-n* may store local content feature(s) 119 associated with more than one member of a family.

One or more of the plurality of opted-out user devices 117*a-n* may be associated with at least one allowed device. The allowed device(s) associated with a particular opted-out user device of the plurality of opted-out user devices 117*a-n* may comprise one or more device(s) that are permitted to capture content depicting a user associated with that opted-out user device. The allowed device(s) may be selected by or indicated by a user associated with the opted-out user device. For example, the allowed device(s) may comprise the device(s) of friends or family members of the user. If an opted-out device is associated with allowed device(s), the opted-out device may store data indicating the allowed device(s). The server device(s) 102 may store data indicating the allowed device(s) associated with the plurality of opted-out user devices 117*a-n* as allowed device data 122.

The plurality of opted-out user devices 117*a-n* may comprise a computing device, a mobile device, a tablet, a laptop, a smart device (e.g., smart glasses, smart watch, smart phone), a computing station, a digital streaming device, a set-top box, a streaming stick, a television, and/or the like. In some scenarios, a user may have multiple user devices of the plurality of opted-out user devices 117*a-n*, such as a mobile phone, a smart watch, smart glasses, a combination thereof, and/or the like.

The device 104 and/or the application 106 may be associated with an enabled privacy setting. For example, a user associated with device 104 and/or the application 106 may indicate that he or she wants to enable the privacy setting on the device 104. To enable the privacy setting, the user(s) may select (e.g., click) a toggle associated with the privacy setting. Based on receiving an indication that a user has selected the toggle associated with the privacy setting, the device 104 and/or the application 106 may cause the privacy setting to be enabled. A default setting associated with the device 104 and/or the application 106 may cause enablement of the privacy setting. If a default setting associated with the device 104 and/or the application 106 causes enablement of the privacy setting, the user(s) may not need to manually enable the privacy setting. By enabling the privacy setting on the device 104 and/or the application 106, the user(s) may indicate that they do not want to capture content depicting other users without receiving permission from the other users.

The device 104 and/or the application 106 may capture content at a first location. The first location may be a public location (e.g., park, public street/sidewalk, shopping center, restaurant, etc.). The first location may be a private location (e.g., a privately owned home). A user associated with the device 104 and/or the application 106 may use the device 104 and/or the application 106 to capture content at the first location. The device 104 and/or the application 106 may be configured to capture content at the first location without user input. For example, the device 104 and/or the application 106 may be configured to take an image or video at the first location automatically.

If an opted-out user device from the plurality of opted-out user devices 117a-n is located at or near the first location, it may be possible or likely that a user associated with that opted-out user device is depicted in the content captured by the device 104 and/or the application 106. If the device 104 and/or the application 106 captures content at the first location, the device 104 and/or the application 106 may cause data to be sent to any of the plurality of opted-out user devices 117a-n that are located proximate to the first location (e.g., the proximate opted-out user devices). The proximate opted-out user devices may be associated with a second location that is within a threshold proximity to the first location. The threshold proximity may comprise any distance, such as ten feet, twenty feet, thirty feet, etc. The proximate opted-out user devices may comprise any quantity of the plurality of opted-out user devices 117a-n. The device 104 and/or the application 106 may send the data to the proximate opted-out user devices. The device 104 and/or the application 106 may send the data to the server device(s) 102. The server device(s) 102 may forward (e.g., send) the data to the proximate opted-out user devices. The data may not be sent to any of the plurality of opted-out user devices 117a-n that are not located proximate to the first location.

If a proximate opted-out user device is associated with allowed device data indicating that the device 104 has permission to capture content depicting a user associated with that proximate opted-out user device, the data may not be sent to that proximate opted-out user device. For example, if the server device(s) 102 determine, based on the allowed device data 122, that the device 104 has permission to capture content depicting a user associated with a proximate opted-out user device, the server device(s) 102 may prevent the forwarding or sending of the data to that particular proximate opted-out user device.

The data may indicate one or more content features associated with the content. The content features may comprise features (e.g., facial, physical, vocal, etc.) associated with one or more individuals depicted in the content. The device 104 and/or the application 106 may generate the data. The device 104 and/or the application 106 may generate the data by applying one or more machine learning models to the content. The data may comprise facial landmark data associated with one or more individuals depicted in the content. The data may comprise encrypted data. The data may comprise one or more of a plurality of vectors, a facial signature, or a machine model generated representation indicating the features associated with the individual(s) depicted in the content.

The proximate opted-out user devices may be determined by the server device(s) 102. The server device(s) 102 may receive location data from the plurality of opted-out user devices 117a-n. The location data may indicate a location or position of the plurality of opted-out user devices 117a-n. The location data may be timestamped (e.g., indicate a time associated with each location of the plurality of opted-out user devices 117a-n). The plurality of opted-out user devices 117a-n may periodically send the location data to the server device(s) 102. The plurality of opted-out user devices 117a-n may send the location data to the server device(s) 102 automatically (e.g., without receiving a request from the server device(s) 102). The plurality of opted-out user devices 117a-n may send the location data to the server device(s) 102 based on receiving a request for location data from the server device(s) 102. The server device(s) 102 may store the location data received from the plurality of opted-out user devices 117a-n as opted-out device data 120.

If the device 104 and/or the application 106 captures content at the first location, the device 104 and/or the application 106 may send content location data to the server device(s) 102. The content location data may indicate the first location. The server device(s) 102 may receive the content location data. The server device(s) 102 may compare the content location data to the location data received from each of the plurality of opted-out user devices 117a-n. Based on comparing the content location data to the location data received from each of the plurality of opted-out user devices 117a-n, the server device(s) 102 may determine which (if any) of the plurality of opted-out user devices 117a-n are located proximate (e.g., within the threshold proximity or distance) to the first location.

The proximate opted-out user devices may be determined by the device 104 and/or the application 106. The device 104 and/or the application 106 may wirelessly communicate with the plurality of opted-out user devices 117a-n to determine which (if any) of the plurality of opted-out user devices 117a-n are located proximate to (e.g., in range of) the first location. The device 104 and/or the application 106 may wirelessly communicate with the plurality of opted-out user devices 117a-n using one or more of Bluetooth, WiFi, Bluetooth Low Energy (BLE), Zigbee, Z-Wave, 6LoWPAN, Near field Communication (NFC), WiFi Direct, Global System for Mobile Communication (GSM), long-term evolution (LTE), and/or the like. The device 104 and/or the application 106 may utilize depth information associated with the content to initialize a radar scan. The radar scan may comprise an ultra-wideband radar sensing scan. The device 104 and/or the application 106 may utilize the radar scan to determine which (if any) of the plurality of opted-out user devices 117a-n are located in the field of view of the content. The proximate opted-out user devices may comprise the plurality of opted-out user devices 117a-n determined to be located in the field of view of the content.

The proximate opted-out user devices may receive the data indicating the one or more content features associated with the content. Each of the proximate opted-out user devices may determine if at least a portion of the content feature(s) indicated by the data correspond to at least a portion of the local content feature(s) 119 stored on that particular opted-out user device. To determine if at least a portion of the content feature(s) correspond to at least a portion of the local content feature(s) 119, the opted-out user device may compare the data to the local content feature(s) 119. To compare the data to the local content feature(s) 119, the opted-out user device may decrypt the data and compare the decrypted data to the local content feature(s) 119. If at least a portion of the content feature(s) correspond to at least a portion of the local content feature(s) 119, this may indicate that an opted-out user is depicted in the content. If at least a portion of the content feature(s) correspond to at least a portion of the local content feature(s) 119 stored on a particular proximate opted-out user device, that particular proximate opted-out user device may determine an identifier associated with the portion of the content feature(s).

If at least a portion of the content feature(s) correspond to at least a portion of the local content feature(s) 119 stored on a particular proximate opted-out user device, that particular proximate opted-out user device may cause a message (e.g., indication) to be sent. The message may comprise the identifier associated with the portion of the content feature(s) corresponding to at least the portion of the local content feature(s) 119. The message may be sent to the device 104 and/or the application 106. The proximate opted-out user device may send the message to the device 104 and/or the application 106. The proximate opted-out user device may send the message to the server device(s) 102. The server device(s) 102 may forward (e.g., send) the message to the device 104 and/or the application 106.

The device 104 and/or the application 106 may receive the message. The message may comprise an instruction for the device 104 and/or the application 106 to obfuscate at least a portion of the content. The message may comprise an instruction for the device 104 and/or the application 106 to obfuscate at least the portion of the content corresponding to the identifier. Based on receiving the message, the device 104 and/or the application 106 may obfuscate at least a portion of the content. Obfuscating the at least a portion of the content may comprise blurring the portion of the content, replacing the portion of the content with synthetic feature(s), obfuscating audio in the content, etc. For example, obfuscating the at least a portion of the content may comprise blurring out the face and/or body of the opted-out user in the content, replacing physical feature(s) of the opted-out user in the content with synthetic feature(s), obfuscating the voice of the opted-out user in the content, and/or the like. Obfuscating the at least a portion of the content may prevent the opted-out user from being depicted in the content, thus preserving the privacy of the opted-out user.

The device 104 and/or the application 106 may save the obfuscated content. The device 104 and/or the application 106 may save the obfuscated content as privacy-enhanced content 107. Obfuscating the at least a portion of the content before saving the content may prevent the opted-out user from being depicted in the saved content, thus preserving the privacy of the opted-out user.

A proximate opted-out user device may be associated with allowed device data indicating that the device 104 has permission to capture content depicting a user associated with that proximate opted-out user device. If such a proximate opted-out user device receives the data indicating the content feature(s), the proximate opted-out user device may not cause an indication to be sent (e.g., to the server device(s) 102 and/or to the device 104). The proximate opted-out user device may not cause an indication to be sent even if at least a portion of the content feature(s) correspond to at least a portion of the local content feature(s) 119 stored on that particular opted-out user device. The proximate opted-out user device may not determine if at least a portion of the content feature(s) correspond to at least a portion of the local content feature(s) 119 stored on that particular opted-out user device.

Figure 2:
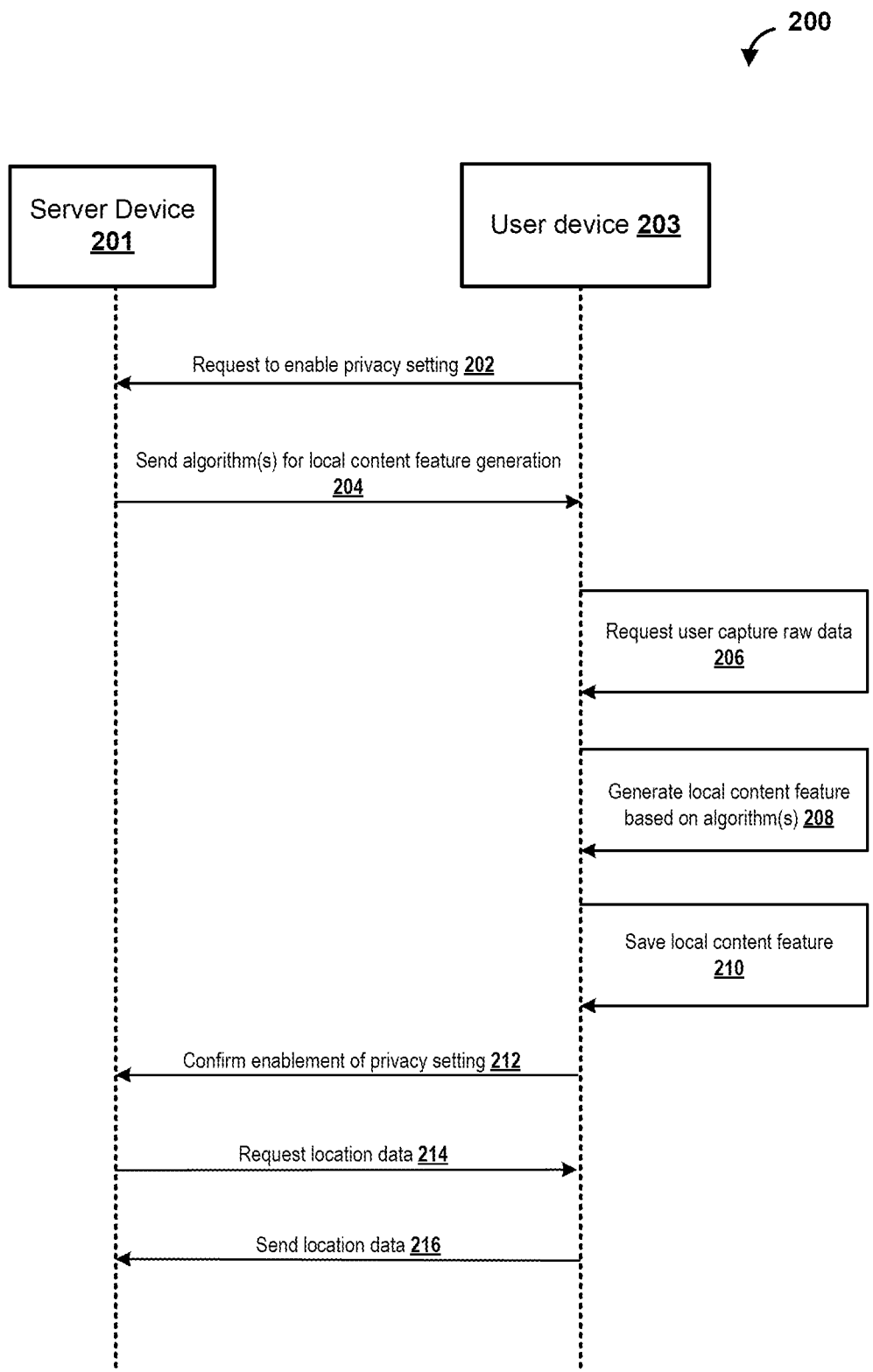
FIG. 2 is an example privacy preservation process.

FIG. 2 is example privacy preservation process 200. The process 200 may be performed to enable a privacy setting on a user device 203. The user device 203 may, for example, comprise one of the plurality of user devices 117a-n. A user associated with the user device 203 may not want to be depicted in content without their permission. For example, the user may not want their face to be depicted in images taken without their permission or their voice to be depicted in videos taken without their permission. To prevent the user from being depicted in content without their permission, the user may enable a privacy setting on the user device 203.

To enable the privacy setting on the user device 203, the user may select (e.g., click) a toggle associated with the privacy setting. By enabling the privacy setting on the user device(s), the user may indicate that he or she does not want to be captured in content taken without their permission. If the user enables the privacy setting, the user device 203 may send a request to a server device 201. The server device 201 may, for example, comprise the server device(s) 102. The request may comprise a request to enable the privacy setting. The server device 201 may receive the request. At 204, based on receiving the request, the server device 201 may send algorithm data to the user device 203. The algorithm data may indicate algorithms that the user device 203 may use for generating local content features. The algorithms may comprise one or more machine learning algorithms. The user device 203 may receive the algorithm data. At 206, based on receiving the algorithm data, the user device 203 may request that the user capture raw data. The raw data may comprise raw image data and/or raw audio data. The user may capture the raw data using a camera and/or microphone associated with the user device 203.

The raw data may be used to generate the local content feature(s). At 208, the user device 203 may use the algorithm data to generate the local content feature(s) based on the raw data. At 210, the local content feature(s) may be saved by the user device 203. The saved local content feature(s) may not be accessible by any device other than the user device 203. The saved local content feature(s) may not be accessible by the server device 201. The saved local content feature(s) may comprise facial landmark data associated with the user. The saved local content feature(s) may comprise data indicating facial features, physical features, vocal features, etc. associated with the user.

At 212, the user device 203 may send an indication to the server device 201. The user device 203 may send the indication to the server device 201 based on saving the local content feature(s). The indication may confirm enablement of the privacy setting on the user device 203. The server device 201 may receive the indication. Based on receiving the indication, the server device 201 may store data indicating that the user device 203 is an opted-out device.

The server device 201 may receive location data from the user device 203. The server device 201 may receive location data from the user device 203 based on confirmation of enablement of the privacy setting on the user device 203. At 214, the server device 201 may request location data associated with the user device 203. To request the location data associated with the user device 203, the server device 201 may send a request to the user device 203. At 216, the user device 203 may send location data to the server device 201. The location data may indicate a location or position of the user device 203. The location data may be timestamped (e.g., indicate a time associated with each location of the user device 203). The user device 203 may periodically send the location data to the server device 201. The user device 203 may send the location data to the server device 201 automatically (e.g., without receiving the request from the server device 201). The user device 203 may send the location data to the server device 201 based on receiving the request for location data from the server device 201.

Figure 3:
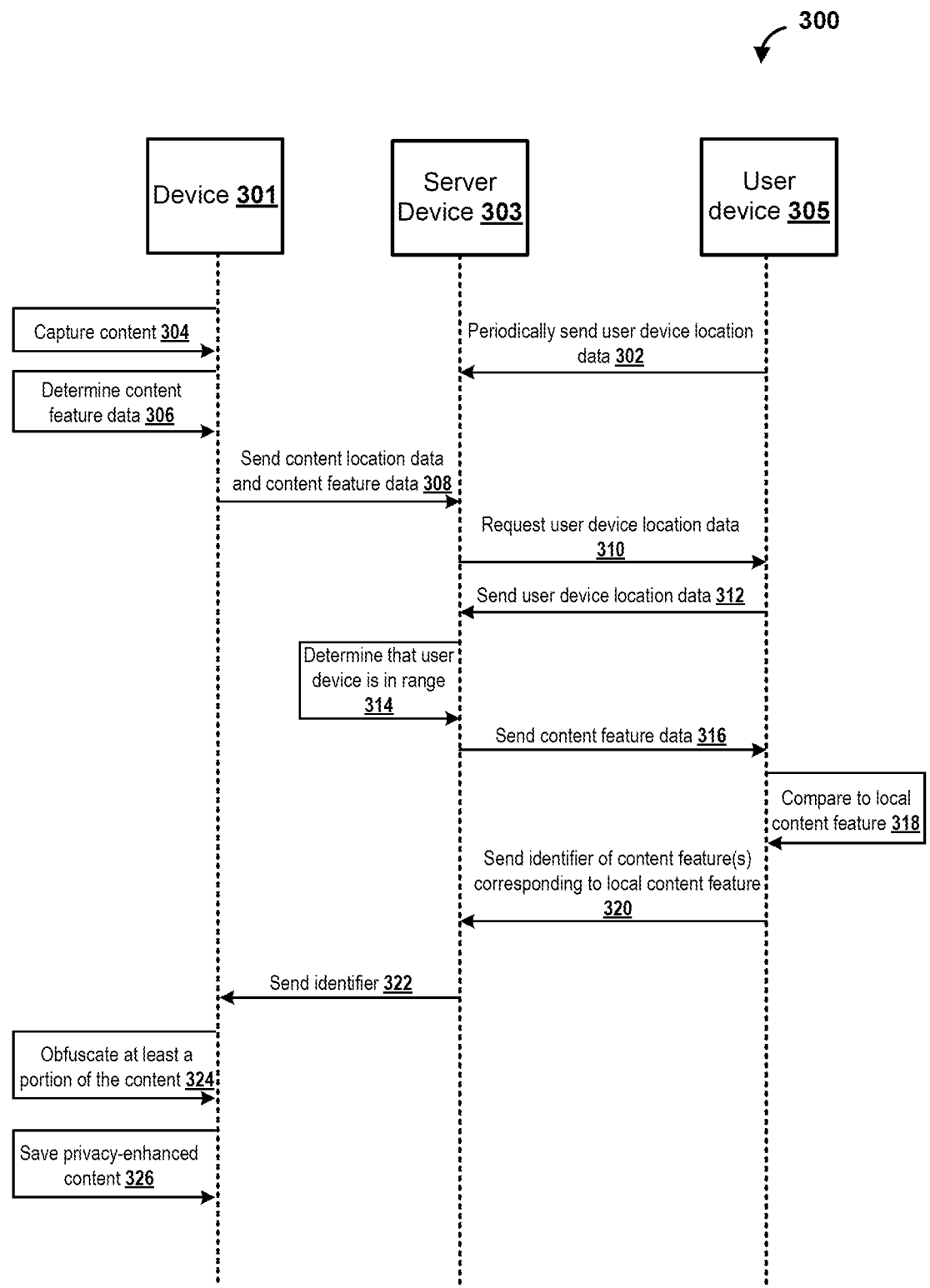
FIG. 3 is an example privacy preservation process.

FIG. 3 is an example privacy preservation process 300. The process 300 may be performed to obscure the identity of an opted-out user in content. A server device 303 may receive location data from a user device 305. The server device 303 may comprise, for example, the server device(s) 102 of FIG. 1 and/or the server device 201 of FIG. 2. The user device 305 may comprise an opted-out user device. The user device 305 may comprise, for example, any of the plurality of opted-out user devices 117 and/or the user device 203.

At 302, the user device 305 may send location data to the server device 303. The location data may indicate a location or position of the user device 305. The location data may be timestamped (e.g., indicate a time associated with each location of the user device 305). The user device 305 may periodically (e.g., every five minutes, every ten minutes, every fifteen minutes, etc.) send the location data to the server device 303. The user device 305 may send the location data to the server device 303 automatically (e.g., without receiving a request for location data from the server device 303).

At 304, a device 301 (e.g., user device, computing device, camera device, component of a device, mobile device, wearable device, component of a device) may capture content. The device 301 may comprise, for example, the device 104 of FIG. 1. The content may comprise an image and/or a video. The device 301 may capture the content at a first location. At 306, the device 301 may determine (e.g., generate) content feature data associated with the content. The content feature data may indicate one or more content features associated with the content. The content features may comprise features (e.g., facial, physical, vocal, etc.) associated with one or more individuals depicted in the content. The device 301 may generate the content feature data by applying one or more machine learning models to the content. The content feature data may comprise facial landmark data associated with one or more individuals depicted in the content. The content feature data may comprise encrypted data. The content feature data may comprise one or more of a plurality of vectors, a facial signature, or a machine model generated representation indicating the features associated with the individual(s) depicted in the content.

At 308, the device 301 may send the content feature data to the server device 303. The device 301 may send content location data to the server device 303. The content location data may indicate a timestamped location associated with the content. For example, the content location data may indicate the first location and time at which the content is captured. The server device 303 may receive the content feature data. The server device 303 may receive the content location data.

At 310, the server device 303 may request location data associated with the user device 305. To request the location data associated with the user device 305, the server device 303 may send a request for location data to the user device 305. The user device 305 may receive the request for location data. At 312, the user device 305 may send location data to the server device 303. The user device 305 may send location data to the server device 303 based on receiving the request for location data. The location data may be timestamped (e.g., indicate the location associated with the user device 305 and a time at which the user device 305 was at the location).

At 314, the server device 303 may determine that the user device 305 is proximate to the first location. For example, the server device 303 may determine that the user device 305 is associated with a second location that is within a threshold proximity to the first location. The server device 303 may determine that the user device 305 is proximate to the first location based on the location data received from the user device 305 and based on the content location data. Determining that the user device 305 is proximate to the first location may comprise comparing the location data received from the user device 305 to the content location data to determine that the user device 305 was located proximate to the first location at substantially the same time (e.g., within ten seconds, fifteen seconds, etc.) that the content is captured.

At 316, the server device 303 may send the content feature data to the user device 305. The server device 303 may send the content feature data to the user device 305 based on determining that the user device 305 is proximate to the first location. The user device 305 may receive the content feature data. At 318, the user device 305 may compare the content feature data to local content feature(s). The user device 305 may compare the content feature data to local content feature(s) based on receiving the content feature data. To compare the content feature data to local content feature(s), the user device 305 may decrypt the content feature data and compare the decrypted content feature data to the local content feature(s).

The local content feature(s) may be stored on the user device 305. The local content feature(s) may not be accessible by the server device 303. The local content feature(s) may not be accessible by the device 301. The local content feature(s) may comprise data indicating one or more features associated with one or more opted-out users associated with the user device 305. The local content feature(s) may comprise facial landmark data. The local content feature(s) may comprise data indicating facial features, physical features, vocal features, etc. associated with one or more opted-out users. The local content feature(s) may comprise one or more of a plurality of vectors, a facial signature, or a machine model generated representation indicating the features associated with the one or more opted-out users.

The content feature data may be compared to the local content feature(s) to determine if at least a portion of the content feature(s) indicated by the content feature data correspond to at least a portion of the local content feature(s). If at least a portion of the content feature(s) correspond to at least a portion of the local content feature(s), this may indicate that an opted-out user associated with the user device 305 is depicted in the content. If at least a portion of the content feature(s) correspond to at least a portion of the local content feature(s), the user device 305 may determine an identifier associated with the portion of the content feature(s). At 320, the user device 305 may send an indication to the server device 303. The indication may comprise an instruction for the device 301 to obfuscate at least a portion of the content. The indication may comprise the identifier associated with the portion of the content feature(s) corresponding to local content feature(s). The indication may comprise an instruction for the device 301 to obfuscate at least the portion of the content corresponding to the identifier.

At 322, the server device 303 may send (e.g., forward) the indication to the device 301. The server device 303 may send (e.g., forward) the indication to the device 301 based on receiving the indication. The device 301 may receive the indication. At 324, the device 301 may obfuscate at least a portion of the content. The device 301 may obfuscate at least a portion of the content based on receiving the indication. For example, the device 301 may obfuscate at least a portion of the content corresponding to the identifier. The device 301 may obfuscate at least the portion of the content by blurring the portion of the content, replacing the portion of the content with synthetic feature(s), obfuscating audio in the portion of the content, etc. Obfuscating at least the portion of the content may comprise blurring out the face and/or body of the opted-out user in the content, replacing physical feature(s) of the opted-out user in the content with synthetic feature(s), obfuscating the voice of the opted-out user in the content, and/or the like. At 326, the device 301 may save the obfuscated content. Obfuscating the at least a portion of the content before saving the content may prevent the opted-out user from being depicted in the saved content, thus preserving the privacy of the opted-out user.

Figure 4:
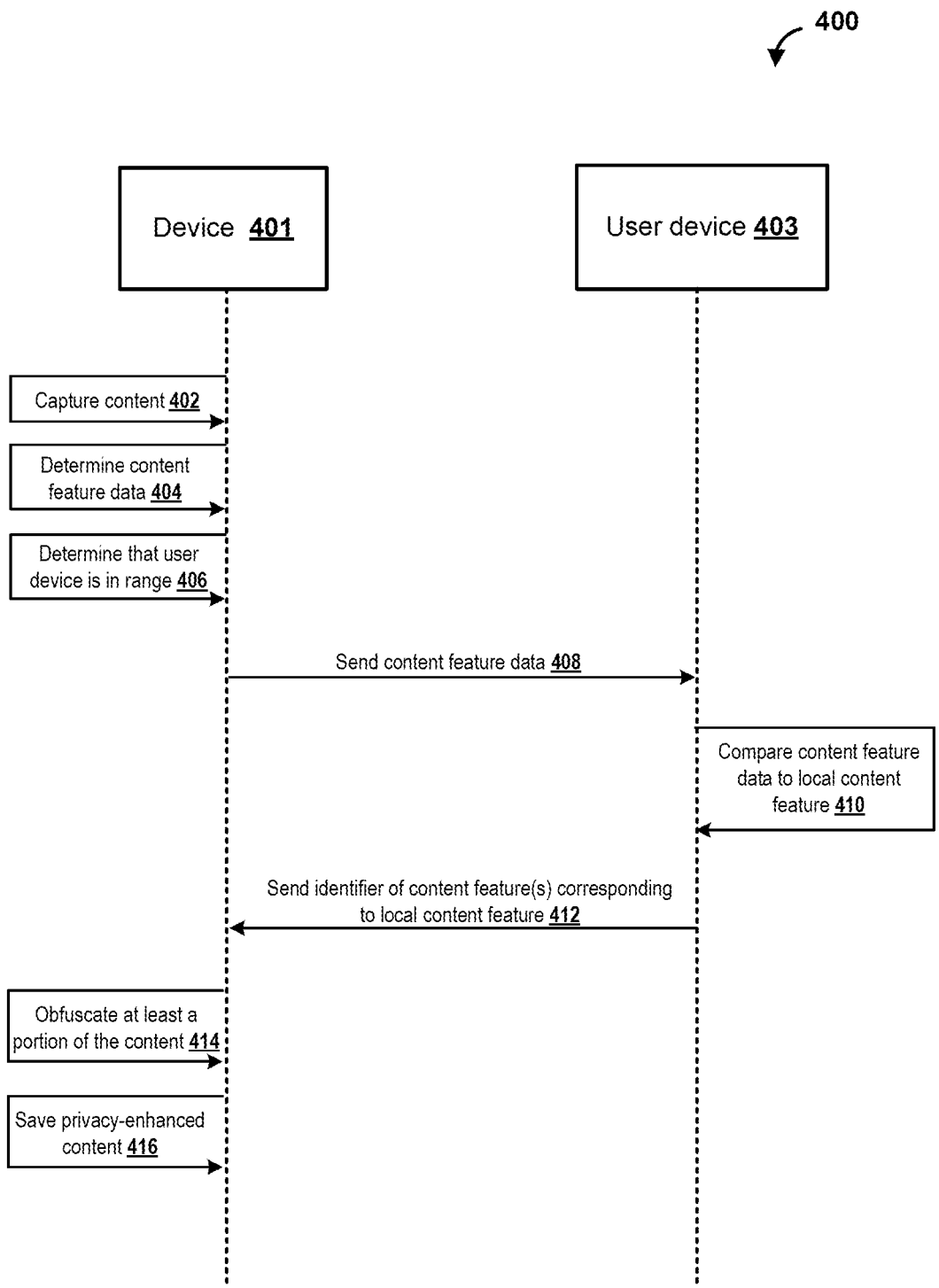
FIG. 4 is an example privacy preservation process.

FIG. 4 is an example privacy preservation process 400. The process 400 may be performed to obscure the identity of an opted-out user in content. At 402, a device 401 (e.g., user device, computing device, camera device, component of a device, mobile device, wearable device, component of a device) may capture content. The device 401 may comprise, for example, the device 104 of FIG. 1 and/or the device 301 of FIG. 3. The content may comprise an image and/or a video. The device 401 may capture content at a first location. At 404, the device 401 may determine (e.g., generate) content feature data associated with the content. The content feature data may indicate one or more content features associated with the content. The content features may comprise features (e.g., facial, physical, vocal, etc.) associated with one or more individuals depicted in the content. The device 401 may generate the content feature data by applying one or more machine learning models to the content. The content feature data may comprise facial landmark data associated with one or more individuals depicted in the content. The content feature data may comprise encrypted data. The content feature data may comprise one or more of a plurality of vectors, a facial signature, or a machine model generated representation indicating the features associated with the individual(s) depicted in the content.

At 406, the device 401 may determine that a user device 403 is located proximate to (e.g., in range of) the first location. For example, the device 401 may determine that the user device 403 is associated with a second location that is within a threshold proximity to the first location. The user device 403 may comprise an opted-out user device. The user device 403 may comprise, for example, any of the plurality of opted-out user devices 117 of FIG. 1, the user device 203 of FIG. 2, and/or the user device 305 of FIG. 3. To determine that the user device 403 is located proximate to the first location, the device 401 may wirelessly communicate with the user device 403. The device 401 may wirelessly communicate with the user device 403 using one or more of Bluetooth, WiFi, Bluetooth Low Energy (BLE), Zigbee, Z-Wave, 6LoWPAN, Near field Communication (NFC), WiFi Direct, Global System for Mobile Communication (GSM), long-term evolution (LTE), and/or the like.

At 408, the device 401 may send the content feature data to the user device 403. The device 401 may send the content feature data to the user device 403 based on determining that the user device 403 is proximate to the first location. The user device 403 may receive the content feature data. At 410, the user device 403 may compare the content feature data to local content feature(s). The user device 403 may compare the content feature data to local content feature(s) based on receiving the content feature data. To compare the content feature data to local content feature(s), the user device 403 may decrypt the content feature data and compare the decrypted content feature data to local content feature(s).

The local content feature(s) may be stored on the user device 403. The local content feature(s) may not be accessible by the device 401. The local content feature(s) may comprise data indicating one or more features associated with one or more opted-out users associated with the user device 403. The local content feature(s) may comprise facial landmark data. The local content feature(s) may comprise data indicating facial features, physical features, vocal features, etc. associated with one or more opted-out users. The local content feature(s) may comprise one or more of a plurality of vectors, a facial signature, or a machine model generated representation indicating the features associated with the one or more opted-out users.

The content feature data may be compared to the local content feature(s) to determine if at least a portion of the content feature(s) indicated by the content feature data correspond to at least a portion of the local content feature(s). If at least a portion of the content feature(s) correspond to at least a portion of the local content feature(s), this may indicate that an opted-out user associated with the user device 403 is depicted in the content. If at least a portion of the content feature(s) correspond to at least a portion of the local content feature(s), the user device 403 may determine an identifier associated with the portion of the content feature(s). At 412, the user device 403 may send an indication to the device 401. The indication may comprise an instruction for the device 401 to obfuscate at least a portion of the content. The indication may comprise the identifier associated with the portion of the content feature(s) corresponding to local content feature(s). The indication may comprise an instruction for the device 401 to obfuscate at least the portion of the content corresponding to the identifier.

The device 401 may receive the indication. At 414, the device 401 may obfuscate at least a portion of the content. The device 401 may obfuscate at least a portion of the content based on receiving the indication. For example, the device 401 may obfuscate at least a portion of the content corresponding to the identifier. The device 401 may obfuscate at least the portion of the content by blurring the portion of the content, replacing the portion of the content with synthetic feature(s), obfuscating audio in the portion of the content, etc. For example, obfuscating at least the portion of the content may comprise blurring out the face and/or body of the opted-out user in the content, replacing physical feature(s) of the opted-out user in the content with synthetic feature(s), obfuscating the voice of the opted-out user in the content, and/or the like. At 416, the device 401 may save the obfuscated content. Obfuscating the at least a portion of the content before saving the content may prevent the opted-out user from being depicted in the saved content, thus preserving the privacy of the opted-out user.

Figure 5:
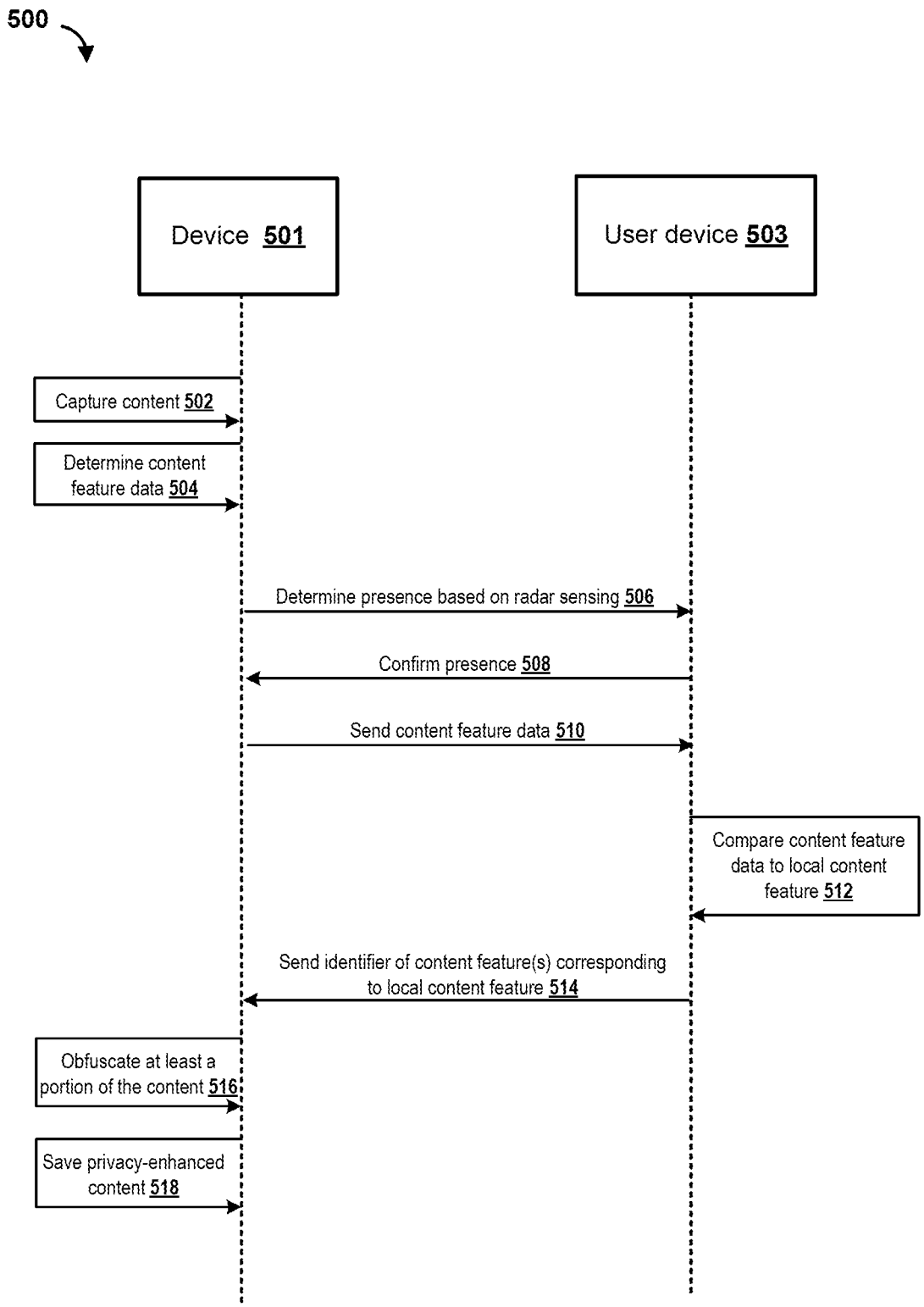
FIG. 5 is an example privacy preservation process.

FIG. 5 is an example privacy preservation process 500. The process 500 may be performed to obscure the identity of an opted-out user in content. At 502, a device 501 (e.g., user device, computing device, camera device, component of a device, mobile device, wearable device, component of a device) may capture content. The device 501 may comprise, for example, the device 104 of FIG. 1, the device 301 of FIG. 3, and/or the device 401 of FIG. 4. The content may comprise an image and/or a video. The device 501 may capture content at a first location. At 504, the device 501 may determine (e.g., generate) content feature data associated with the content. The content feature data may indicate one or more content features associated with the content. The content features may comprise features (e.g., facial, physical, vocal, etc.) associated with one or more individuals depicted in the content. The device 501 may generate the content feature data by applying one or more machine learning models to the content. The content feature data may comprise facial landmark data associated with one or more individuals depicted in the content. The content feature data may comprise encrypted data. The content feature data may comprise one or more of a plurality of vectors, a facial signature, or a machine model generated representation indicating the features associated with the individual(s) depicted in the content.

The device 501 may determine that the user device 503 is located proximate to (e.g., in range of) the first location. At 506, the device 501 may determine that the user device 503 is located proximate to the first located by determining the presence of the user device 503 based on radar sensing. For example, the device 501 may utilize depth information associated with the content to initialize a radar scan. The radar scan may comprise an ultra-wideband radar sensing scan. The device 501 may utilize the radar scan to determine if the user device 503 is located in the field of view of the content. The radar scan may send a communication to user devices that are present in the field of view of the content. The user devices may comprise opted-out devices. The user devices may comprise user devices that are not opted out. The user devices that are opted-out devices may respond to the radar scan. The opted-out devices may respond to the radar scan by confirming their presence in the field of view of the content. At 508, the user device 503 may confirm that it is located proximate to the first location. The user device 503 may confirm its presence in the field of view of the content. To confirm that it is located proximate to the first location, the user device 503 may send a confirmation to the device 501.

At 510, the device 501 may send the content feature data to the user device 503. The device 501 may send the content feature data to the user device 503 based on determining that the user device 503 is proximate to the first location. The user device 503 may receive the content feature data. At 512, the user device 503 may compare the content feature data to local content feature(s). The user device 503 may compare the content feature data to local content feature(s) based on receiving the content feature data. To compare the content feature data to local content feature(s), the user device 503 may decrypt the content feature data and compare the decrypted content feature data to local content feature(s).

The local content feature(s) may be stored on the user device 503. The local content feature(s) may not be accessible by the device 501. The local content feature(s) may comprise data indicating one or more features associated with one or more opted-out users associated with the user device 503. The local content feature(s) may comprise facial landmark data. The local content feature(s) may comprise data indicating facial features, physical features, vocal features, etc. associated with one or more opted-out users. The local content feature(s) may comprise one or more of a plurality of vectors, a facial signature, or a machine model generated representation indicating the features associated with the one or more opted-out users.

The content feature data may be compared to the local content feature(s) to determine if at least a portion of the content feature(s) indicated by the content feature data correspond to at least a portion of the local content feature(s). If at least a portion of the content feature(s) correspond to at least a portion of the local content feature(s), this may indicate that an opted-out user associated with the user device 503 is depicted in the content. If at least a portion of the content feature(s) correspond to at least a portion of the local content feature(s), the user device 503 may determine an identifier associated with the portion of the content feature(s). At 514, the user device 503 may send an indication to the device 501. The indication may comprise an instruction for the device 501 to obfuscate at least a portion of the content. The indication may comprise the identifier associated with the portion of the content feature(s) corresponding to local content feature(s). The indication may comprise an instruction for the device 501 to obfuscate at least the portion of the content corresponding to the identifier.

The device 501 may receive the indication. At 516, the device 501 may obfuscate at least a portion of the content. The device 501 may obfuscate at least a portion of the content based on receiving the indication. For example, the device 501 may obfuscate at least a portion of the content corresponding to the identifier. The device 501 may obfuscate at least the portion of the content by blurring the portion of the content, replacing the portion of the content with synthetic feature(s), obfuscating audio in the portion of the content, etc. For example, obfuscating at least the portion of the content may comprise blurring out the face and/or body of the opted-out user in the content, replacing physical feature(s) of the opted-out user in the content with synthetic feature(s), obfuscating the voice of the opted-out user in the content, and/or the like. At 518, the device 501 may save the obfuscated content. Obfuscating the at least a portion of the content before saving the content may prevent the opted-out user from being depicted in the saved content, thus preserving the privacy of the opted-out user.

Figure 6:
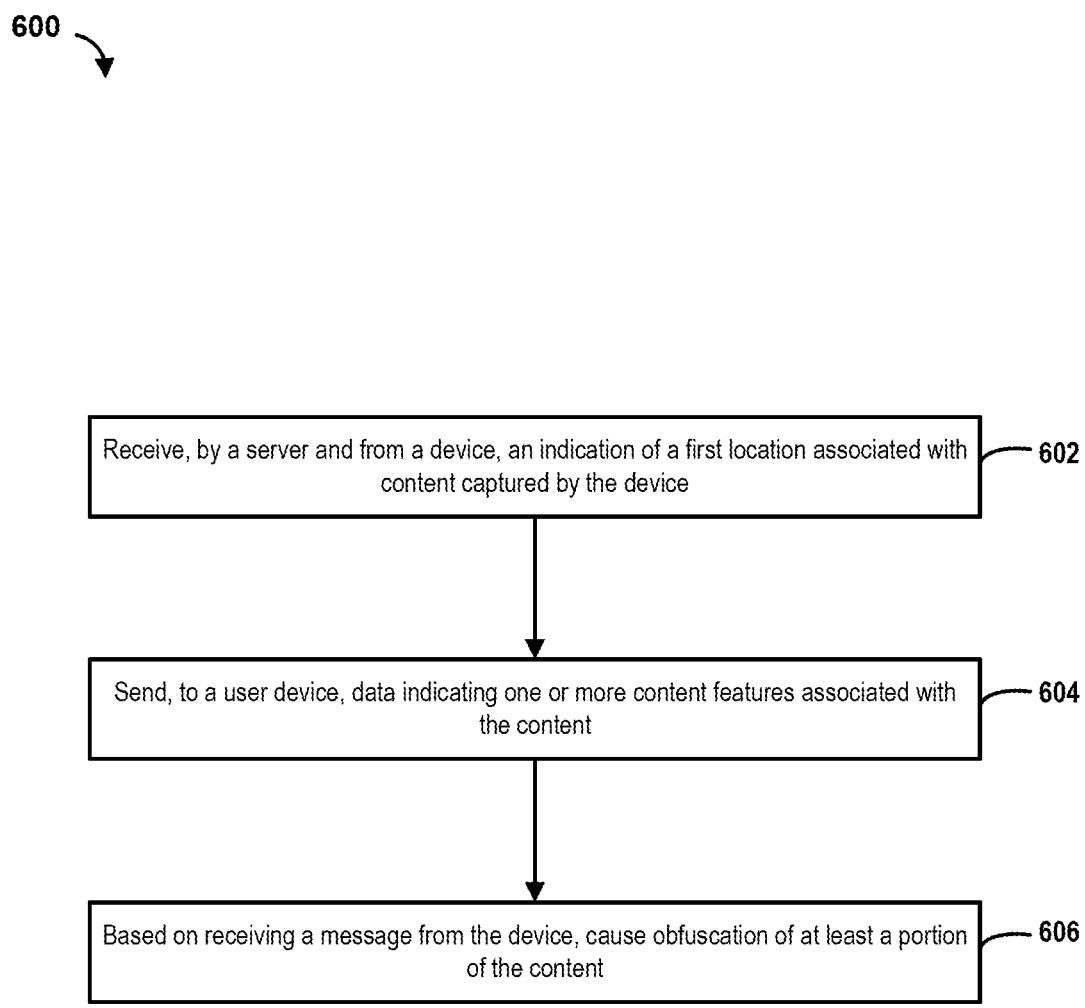
FIG. 6 is an example method for privacy preservation.

FIG. 6 is an example method 600. The method 600 may comprise a computer implemented method for preserving user privacy in captured content. A system and/or computing environment, such as the system 100 of FIG. 1 and/or the computing environment of FIG. 9, may be configured to perform the method 600. For example, one or more of the server device(s) 102 of FIG. 1 may be configured to perform the method 600.

An indication may be received that a user device has enabled a privacy setting. The indication may indicate that one or more users associated with the user device do not want to be captured in content without their permission. If content is captured at a first location, an indication may be sent (e.g., to a server device). At 602, the indication may be received. The indication may be received from a device (e.g., user device, computing device, camera device, component of a device, mobile device, wearable device, component of a device). The indication may be received at a server device. The indication may comprise an indication of a first location. The first location may be associated with content captured by the device. For example, the first location may indicate a geographic location at which the content is captured.

It may be determined that the user device is located proximate to the first location. It may be determined that the user device is located proximate to the first location based on comparing the first location to location data received from the user device. At 604, data may be sent. The data may be sent to the user device. The data may be sent based on the user device being associated with a second location. The second location may be within a threshold proximity to the first location. The data may indicate one or more content features associated with the content. The content features may comprise features (e.g., facial, physical, vocal, etc.) associated with one or more individuals depicted in the content. The data may be generated by applying one or more machine learning models to the content. The data may comprise facial landmark data associated with one or more individuals depicted in the content. The data may comprise encrypted data. The data may comprise one or more of a plurality of vectors, a facial signature, or a machine model generated representation indicating the features associated with the individual(s) depicted in the content.

Based on the data, it may be determined if at least a portion of the content feature(s) indicated by the data correspond to at least a portion of a local content feature stored on the user device. The local content feature may not be accessible by the server device. The local content feature may not be accessible by the device. The local content feature may comprise data indicating one or more features associated with one or more users associated with the user device. The local content feature may comprise facial landmark data. The local content feature may comprise data indicating facial features, physical features, vocal features, etc. associated with the one or more users. The local content feature may comprise one or more of a plurality of vectors, a facial signature, or a machine model generated representation indicating the features associated with the one or more users.

If at least a portion of the content feature(s) correspond to at least a portion of the local content feature, this may indicate that a user associated with the user device is depicted in the content. If at least a portion of the content feature(s) correspond to at least a portion of the local content feature, an identifier associated with the portion of the content feature(s) may be determined. If at least a portion of the content feature(s) correspond to at least a portion of the local content feature, an indication may be sent. The indication may be sent from the user device. The indication may indicate that at least a portion of the one or more content features correspond to at least a portion of the local content feature. The indication may comprise the identifier associated with the portion of the content feature(s) corresponding to at least the portion of the local content feature. The indication may comprise an instruction for the device to obfuscate at least a portion of the content. The indication may comprise an instruction for the device to obfuscate at least the portion of the content corresponding to the identifier.

At 606, obfuscation (e.g., or other processing, modifying, blurring, removing, transforming, replacing, erasing) of at least a portion of the content may be caused. The obfuscation may be caused based on receiving the indication. The indication may be received from the user device. Obfuscation may be caused by sending the indication to the device. The device may receive the indication. Based on receiving the indication, the device may obfuscate at least a portion of the content. Obfuscating the at least a portion of the content may comprise blurring the portion of the content, replacing the portion of the content with synthetic feature(s), obfuscating audio in the content, etc. For example, obfuscating the at least a portion of the content may comprise blurring out the face and/or body of the opted-out user in the content, replacing physical feature(s) of the opted-out user in the content with synthetic feature(s), obfuscating the voice of the opted-out user in the content, and/or the like. Obfuscating the at least a portion of the content may prevent the opted-out user from being depicted in the content, thus preserving the privacy of the opted-out user.

A first user may enable a privacy setting on his mobile device. The first user may use the mobile device at a public location. The mobile device may send user location data to a server. The user location data may indicate that the mobile device is located at the public location. A second user may use a device to take a photo in the public location. Based on the second user taking the photo, the device may send camera location data to a server. The camera location data may indicate that the photo is being captured in the public location. The server may use the user location data and the camera location data to determine that the mobile device is located proximate to the device. Based on determining that the mobile device is located proximate to the device, the server may send data indicating content feature(s) associated with the photo to the mobile device. The mobile device may determine if the first user is depicted in the photo. The mobile device may determine if the first user is depicted in the photo based on comparing the content feature(s) to a local feature stored on the mobile device. If the mobile device determines that the first user is depicted in the photo, the mobile device may send an indication to the server. Based on receiving the indication, the server may cause the device to obfuscate the identify of the user in the photo.

Figure 7:
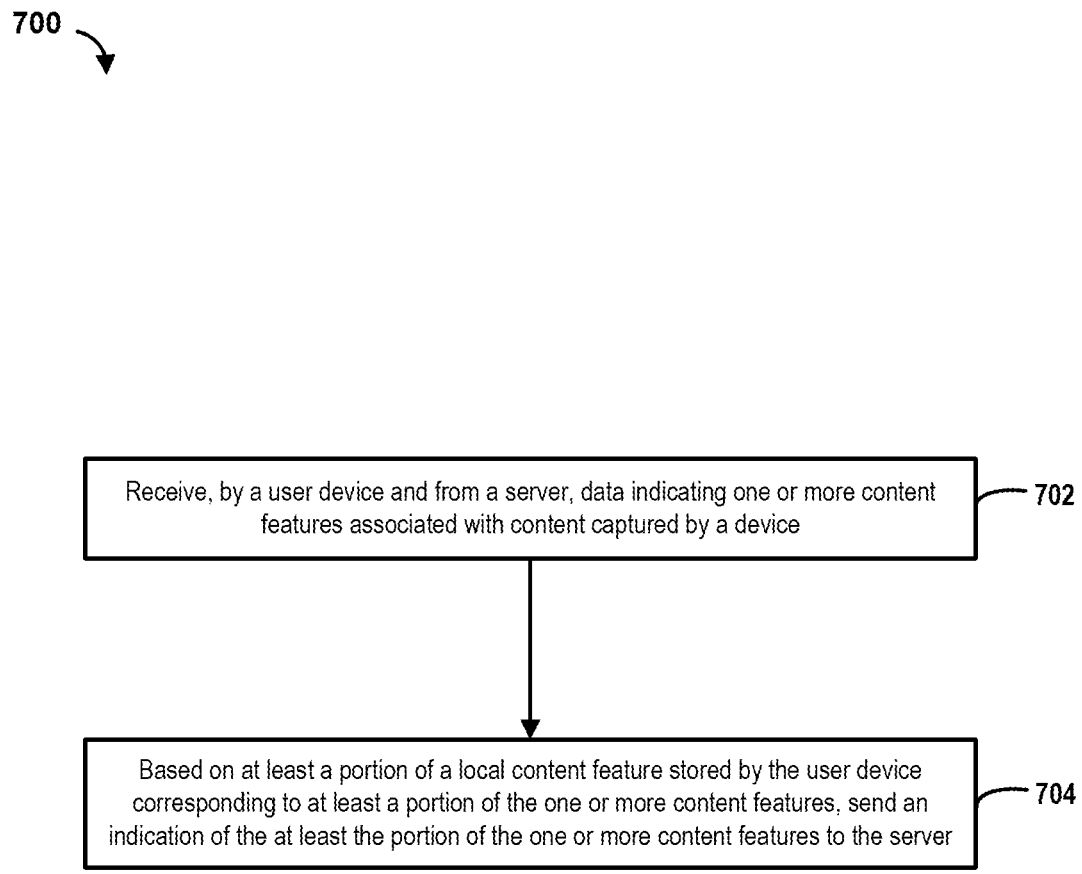
FIG. 7 is an example method for privacy preservation.

FIG. 7 is an example method 700. The method 700 may comprise a computer implemented method for preserving user privacy in captured content. A system and/or computing environment, such as the system 100 of FIG. 1 and/or the computing environment of FIG. 9, may be configured to perform the method 700. For example, one or more of the plurality of opted-out user devices 117*a-n* of FIG. 1 may be configured to perform the method 700.

A user device may enable a privacy setting. If the user device enables the privacy setting, this may indicate that one or more users associated with the user device do not want to be captured in content without their permission. At 702, data may be received. The data may be received by the user device. The data may be received from a server. The data may indicate one or more content features associated with content captured by a device (e.g., user device, computing device, camera device, component of a device, mobile device, wearable device, component of a device). The data may be received based on the user device being associated with a first location within a threshold proximity to a second location. The content may be associated with the second location.

The data may indicate one or more content features associated with the content. The content features may comprise features (e.g., facial, physical, vocal, etc.) associated with one or more individuals depicted in the content. The data may be generated by applying one or more machine learning models to the content. The data may comprise facial landmark data associated with one or more individuals depicted in the content. The data may comprise encrypted data. The data may comprise one or more of a plurality of vectors, a facial signature, or a machine model generated representation indicating the features associated with the individual(s) depicted in the content.

Based on the data, it may be determined if at least a portion of the content feature(s) indicated by the data correspond to at least a portion of a local content feature associated with the privacy setting stored on the user device. The local content feature may not be accessible by the server. The local content feature may not be accessible by the device. The local content feature may comprise data indicating one or more features associated with one or more users associated with the user device. The local content feature may comprise facial landmark data. The local content feature may comprise data indicating facial features, physical features, vocal features, etc. associated with the one or more users. The local content feature may comprise one or more of a plurality of vectors, a facial signature, or a machine model generated representation indicating the features associated with the one or more users.

If at least a portion of the content feature(s) correspond to at least a portion of the local content feature, this may indicate that a user associated with the user device is depicted in the content. If at least a portion of the content feature(s) correspond to at least a portion of the local content feature, an identifier associated with the portion of the content feature(s) may be determined. At 704, an indication may be sent. The indication may be sent based on determining that at least a portion of a local content feature stored by the user device corresponds to at least a portion of the one or more content features. The indication may indicate the at least the portion of the one or more content features that correspond to at least a portion of the local content feature. The indication may comprise the identifier associated with the portion of the content feature(s). The indication may be sent to a server for obfuscation of at least a portion of the content. For example, the server may forward the indication to the device. The device may obfuscate at least a portion of the content. For example, the device may obfuscate at least the portion of the content corresponding to the identifier.

More than one user may share a user device, such as a tablet or mobile phone. For example, multiple family members may share the user device. A privacy setting may be enabled on the shared device. Each of the shared users may register local content features associated with the privacy setting. The local content features may be stored on the user device. The local content features may indicate facial or other physical features of each of the shared users. If the user device receives an indication (e.g., from a server and/or from a device) that the user device is located proximate to a device capturing content, the user device may determine if the local content features associated with any of the shared users corresponds to content feature data associated with the content. If the local content features associated with any of the shared users correspond to content feature data associated with the content, this may indicate that one or more of the shared users are depicted in the content. If the user device determines that one or more of the shared users are depicted in the content, the user device may send an indication to a server and/or to the device. Based on the indication, the device may be caused to obfuscate (e.g., process, modify, blur, remove, transform, replace, erase) the identify of each of the one or more of the shared users depicted in the content.

Figure 8:
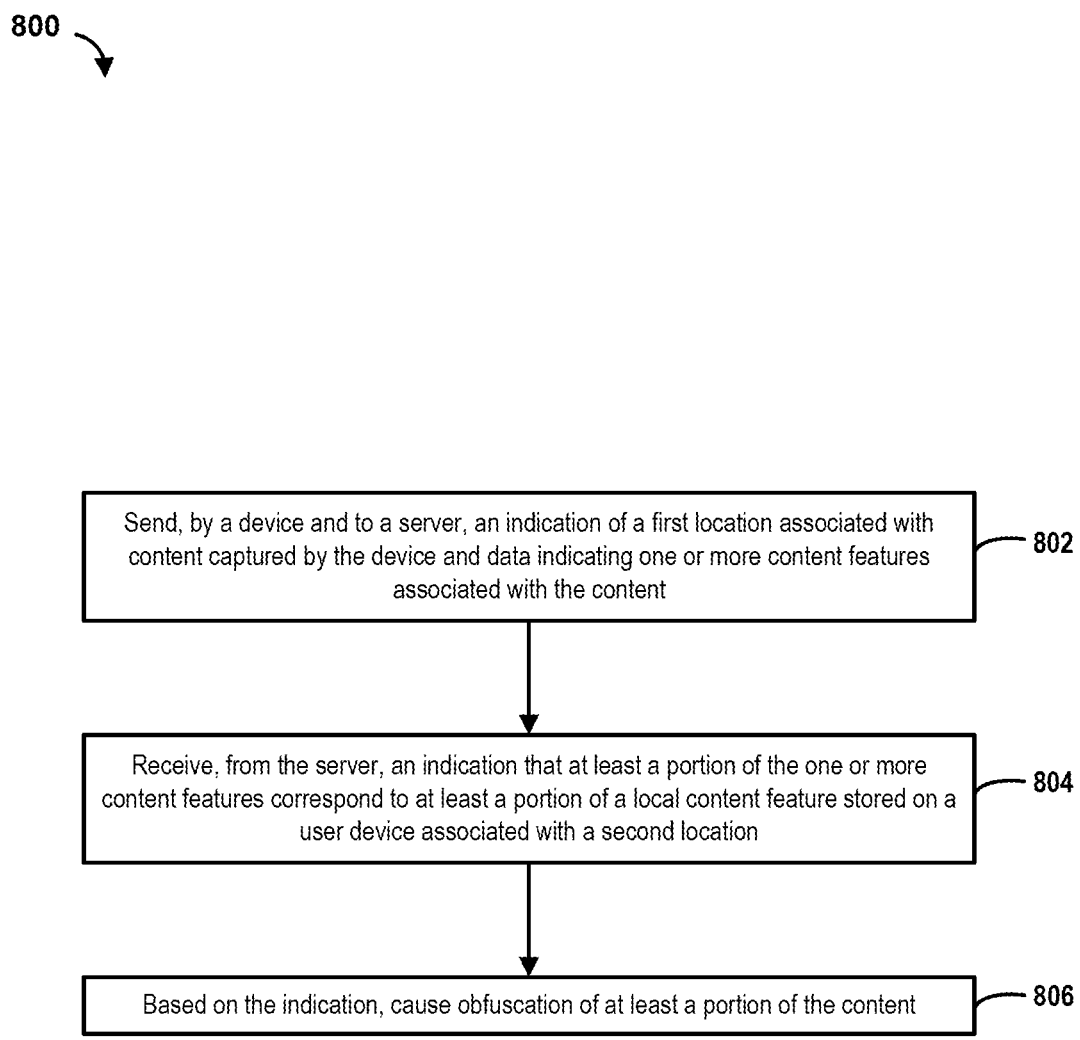
FIG. 8 is an example method for privacy preservation.

FIG. 8 is an example method 800. The method 800 may comprise a computer implemented method for preserving user privacy in captured content. A system and/or computing environment, such as the system 100 of FIG. 1 and/or the computing environment of FIG. 9, may be configured to perform the method 800. For example, the device 104 of FIG. 1 may be configured to perform the method 800.

Content may be captured at a first location. The content may be captured by a device (e.g., user device, computing device, camera device, component of a device, mobile device, wearable device, component of a device). Data indicating one or more content features associated with the content may be generated. The data may be generated using one or more machine learning algorithms. At 802, an indication may be sent. The indication may be sent by the. The indication may be sent to a server. The indication may comprise an indication of the first location. The data indicating one or more content features associated with the content may be sent. The data be sent by the device. The data may be sent to the server. The content features may comprise features (e.g., facial, physical, vocal, etc.) associated with one or more individuals depicted in the content. The data may be generated by applying one or more machine learning models to the content. The data may comprise facial landmark data associated with one or more individuals depicted in the content. The data may comprise encrypted data. The data may comprise one or more of a plurality of vectors, a facial signature, or a machine model generated representation indicating the features associated with the individual(s) depicted in the content.

The indication and the data may be received. The indication and the data may be received by the server. Based on the indication, the server may determine that the user device is located proximate to the first location. For example, the server may determine that the user device is associated with a second location within a threshold proximity to the first location. Based on determining that the user device is located proximate to the first location, the data may be sent to the user device. For example, the server may send the data to the user device. The user device may receive the data.

Based on the data, the user device may determine if at least a portion of the content feature(s) indicated by the data correspond to at least a portion of a local content feature associated with the privacy setting stored on the user device. The local content feature may not be accessible by the server. The local content feature may not be accessible by the device. The local content feature may comprise data indicating one or more features associated with one or more users associated with the user device. The local content feature may comprise facial landmark data. The local content feature may comprise data indicating facial features, physical features, vocal features, etc. associated with the one or more users. The local content feature may comprise one or more of a plurality of vectors, a facial signature, or a machine model generated representation indicating the features associated with the one or more users.

If at least a portion of the content feature(s) correspond to at least a portion of the local content feature, this may indicate that a user associated with the user device is depicted in the content. If at least a portion of the content feature(s) correspond to at least a portion of the local content feature, an identifier associated with the portion of the content feature(s) may be determined. An indication may be sent by the user device and to the server. The indication may indicate the at least the portion of the one or more content features that correspond to at least a portion of the local content feature. The indication may comprise the identifier associated with the portion of the content feature(s). The server may receive the indication. The server may send the indication. At 804, an indication may be received. The indication may be received from the server. The indication may be received at the device. At 806, obfuscation (e.g., or other processing, modifying, blurring, removing, transforming, replacing, erasing) of at least a portion of the content may be caused. The obfuscation may be caused based on the indication. The device may obfuscate at least a portion of the content. For example, the device may obfuscate at least the portion of the content corresponding to the identifier.

A privacy setting may be enabled on a user device. One or more users associated with the user device may register local content features associated with the privacy setting. The local content features may be stored on the user device. The local content features may indicate vocal features of each of the one or more users. If the user device receives an indication (e.g., from a server and/or from a device) that the user device is located proximate to a device capturing a video, the user device may determine if the local content features associated with any of the shared users corresponds to content feature data associated with the video. If the user device determines that the local content features associated with any of the users corresponds to content feature data associated with the video, this may indicate that a voice of at least one of the users is depicted in the video. If a voice of at least one of the users is depicted in the video, the user device may send an indication to a server and/or to the device. Based on the indication, the device may be caused to obfuscate the voice of the users depicted in the video. Obfuscating the voice may comprise removing the audio corresponding to the voice from the video and/or modifying the audio corresponding to the voice so that it no longer sounds like the voice.

Figure 9:
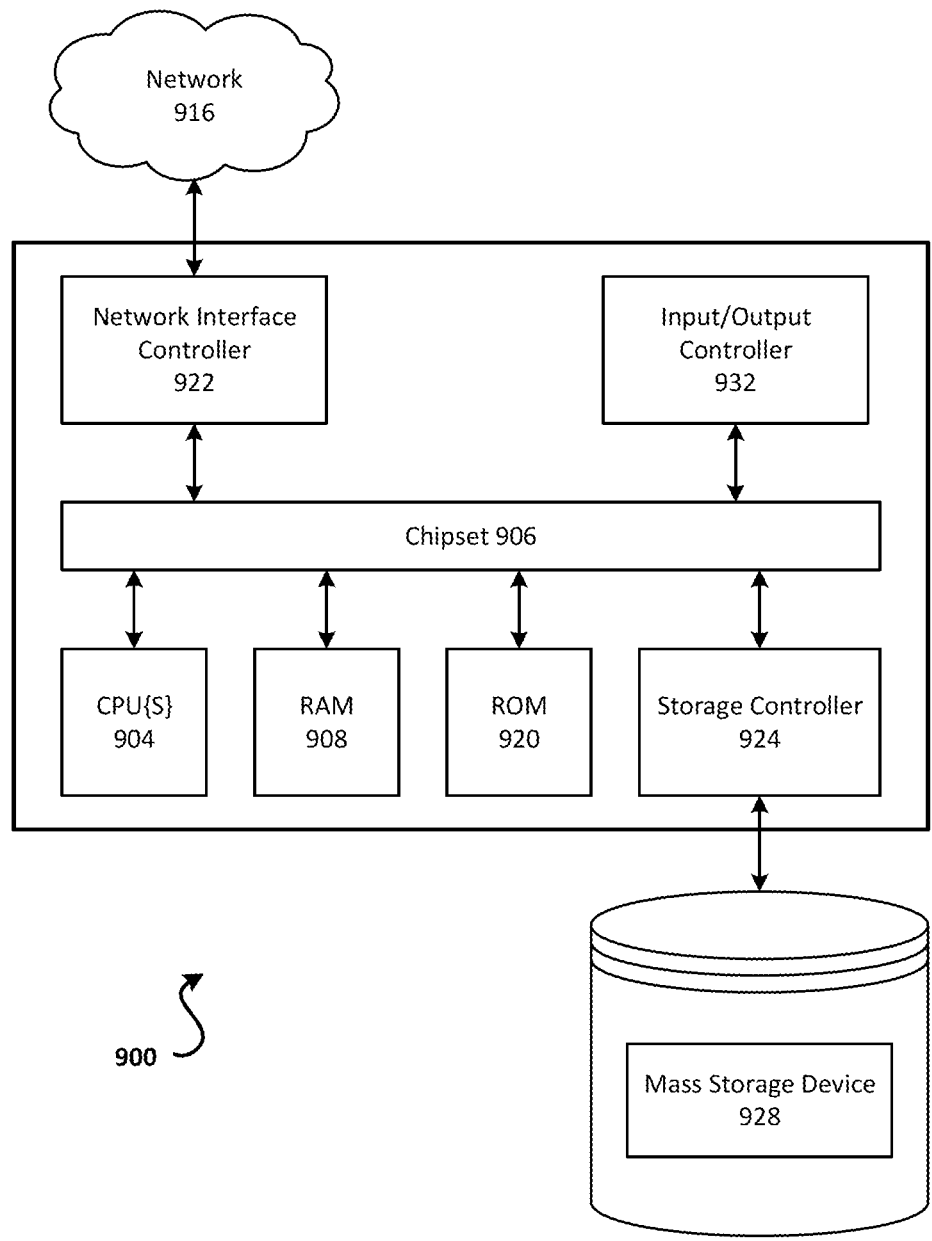
FIG. 9 is a block diagram illustrating an example computing device.

FIG. 9 depicts a computing device that may be used in various aspects, such as the servers and/or devices depicted in FIG. 1. With regard to the example architecture of FIG. 1, the server device 102, the plurality of opted-out user devices 117a-n, and/or the device 104 may each be implemented in an instance of a computing device 900 of FIG. 9.

The computer architecture in FIG. 9 is a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIG. 6, FIG. 7, and FIG. 8.

The computing device 900 may include a baseboard, or "motherboard," which is a printed circuit board to which a multitude of components or devices may be connected by way of a system bus or other electrical communication paths. One or more central processing units (CPUs) 904 may operate in conjunction with a chipset 906. The CPU(s) 904 may be standard programmable processors that perform arithmetic and logical operations necessary for the operation of the computing device 900.

The CPU(s) 904 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 904 may be augmented with or replaced by other processing units, such as GPU(s) 905. The GPU(s) 905 may comprise processing units specialized for but not necessarily limited to highly parallel computations, such as graphics and other visualization-related processing.

A chipset 906 may provide an interface between the CPU(s) 904 and the remainder of the components and devices on the baseboard. The chipset 906 may provide an interface to a random access memory (RAM) 908 used as the main memory in the computing device 900. The chipset 906 may further provide an interface to a computer-readable storage medium, such as a read-only memory (ROM) 920 or non-volatile RAM (NVRAM) (not shown), for storing basic routines that may help to start up the computing device 900 and to transfer information between the various components and devices. ROM 920 or NVRAM may also store other software components necessary for the operation of the computing device 900 in accordance with the aspects described herein.

The computing device 900 may operate in a networked environment using logical connections to remote computing nodes and computer systems through local area network (LAN) 916. The chipset 906 may include functionality for providing network connectivity through a network interface controller (NIC) 922, such as a gigabit Ethernet adapter. A NIC 922 may be capable of connecting the computing device 900 to other computing nodes over a network 916. It should be appreciated that multiple NICs 922 may be present in the computing device 900, connecting the computing device to other types of networks and remote computer systems.

The computing device 900 may be connected to a mass storage device 928 that provides non-volatile storage for the computer. The mass storage device 928 may store system programs, application programs, other program modules, and data, which have been described in greater detail herein. The mass storage device 928 may be connected to the computing device 900 through a storage controller 924 connected to the chipset 906. The mass storage device 928 may consist of one or more physical storage units. A storage controller 924 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 900 may store data on a mass storage device 928 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 928 is characterized as primary or secondary storage and the like.

For example, the computing device 900 may store information to the mass storage device 928 by issuing instructions through a storage controller 924 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 900 may further read information from the mass storage device 928 by detecting the physical states or characteristics of one or more particular locations within the physical storage units.

In addition to the mass storage device 928 described above, the computing device 900 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 900.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 928 depicted in FIG. 9, may store an operating system utilized to control the operation of the computing device 900. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 928 may store other system or application programs and data utilized by the computing device 900.

The mass storage device 928 or other computer-readable storage media may also be encoded with computer-executable instructions, which, when loaded into the computing device 900, transforms the computing device from a general-purpose computing system into a special-purpose computer capable of implementing the aspects described herein. These computer-executable instructions transform the computing device 900 by specifying how the CPU(s) 904 transition between states, as described above. The computing device 900 may have access to computer-readable storage media storing computer-executable instructions, which, when executed by the computing device 900, may perform the methods described in relation to FIG. 6, FIG. 7, and FIG. 8.

A computing device, such as the computing device 900 depicted in FIG. 9, may also include an input/output controller 932 for receiving and processing input from a number of input devices, such as a keyboard, a mouse, a touchpad, a touch screen, an electronic stylus, or other type of input device. Similarly, an input/output controller 932 may provide output to a display, such as a computer monitor, a flat-panel display, a digital projector, a printer, a plotter, or other type of output device. It will be appreciated that the computing device 900 may not include all of the components shown in FIG. 9, may include other components that are not explicitly shown in FIG. 9, or may utilize an architecture completely different than that shown in FIG. 9.

As described herein, a computing device may be a physical computing device, such as the computing device 900 of FIG. 9. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, or in addition, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method comprising:
   receiving, by a server and from a device, an indication of a first location associated with content captured by the device;
   sending, to a user device and based on the user device being associated with a second location within a threshold proximity to the first location, data indicating one or more content features associated with the content; and
   based on receiving an indication, from the user device, that at least a portion of the one or more content features associated with the content correspond to at least a portion of a local content feature associated with a privacy setting and stored on the user device, causing obfuscation of at least a portion of the content.

2. The method of claim 1, further comprising receiving, by the server and from the user device, an indication that at least one user associated with the user device has enabled the privacy setting.

3. The method of claim 1, wherein the data indicating the one or more content features associated with the content comprises data indicating one or more physical features associated with one or more users depicted by the content, wherein the data comprises one or more of a plurality of vectors, a facial signature, or a machine model generated representation.

4. The method of claim 1, wherein the local content feature associated with the privacy setting comprises data indicating one or more physical features associated with at least one user associated with the user device.

5. The method of claim 1, wherein the local content feature associated with the privacy setting is not accessible by the server or the device.

6. The method of claim 1, wherein the at least a portion of the content caused to be obfuscated corresponds to the portion of the one or more content features, and wherein causing obfuscation of the at least the portion of the content comprises causing one or more of blurring of the at least a portion of the content or replacing the at least a portion of the content with a synthetic content portion.

7. The method of claim 1, wherein receiving the indication, from the user device, that the at least the portion of the one or more content features corresponds to the at least the portion of the local content feature comprises receiving an identifier associated with the portion of the one or more content features.

8. A method comprising:
   receiving, by a user device and from a server, and based on the user device being associated with a first location within a threshold proximity to a second location, data indicating one or more content features associated with content captured by a device, wherein the content is associated with the second location; and
   based on determining that at least a portion of a local content feature associated with a privacy setting stored by the user device corresponds to at least a portion of the one or more content features associated with the content, sending an indication of the at least the portion of the one or more content features to the server for obfuscation of at least a portion of the content.

9. The method of claim 8, further comprising sending, to the server, an indication that at least one user associated with the user device has enabled the privacy setting.

10. The method of claim 8, wherein the data indicating the one or more content features associated with the content comprises data indicating one or more physical features associated with one or more users depicted by the content, wherein the data comprises one or more of a plurality of vectors, a facial signature, or a machine model generated representation.

11. The method of claim 8, wherein the local content feature associated with the privacy setting comprises data indicating one or more physical features associated with at least one user associated with the user device.

12. The method of claim 8, wherein the local content feature associated with the privacy setting is not accessible by the server or the device.

13. The method of claim 8, wherein the server is configured, based on receiving the indication of the at least the portion of the one or more content features, to cause obfuscation of at least a portion of the content.

14. The method of claim 13, wherein the at least the portion of the content caused to be obfuscated corresponds to the portion of the one or more content features, and wherein the server is configured to cause obfuscation of the at least the portion of the content by causing at least one of blurring of the portion of the content or replacing the portion of the content with a synthetic content portion.

15. The method of claim 8, wherein sending the indication of the least the portion of the one or more content features to the server comprises sending an identifier associated with the portion of the one or more content features.

16. A method comprising:
    sending, by a device and to a server, an indication of a first location associated with content captured by the device and data indicating one or more content features associated with the content;
    receiving, from the server, an indication that at least a portion of the one or more content features associated with the content correspond to at least a portion of a local content feature associated with a privacy setting stored on a user device, wherein the user device is associated with a second location within a threshold proximity to a first location; and
    based on the indication, causing obfuscation of at least a portion of the content.

17. The method of claim 16, further comprising:
    capturing the content, wherein the content comprises at least one image; and
    generating the data indicating the one or more content features associated with the content, wherein the data indicating the one or more content features associated with the content comprises data indicating one or more physical features associated with one or more users depicted by the content.

18. The method of claim 16, wherein the local content feature associated with the privacy setting comprises data indicating one or more physical features associated with at least one user associated with the user device.

19. The method of claim 16, wherein the local content feature associated with the privacy setting is not accessible by the server or the device.

20. The method of claim 16, wherein the at least a portion of the content caused to be obfuscated corresponds to the portion of the one or more content features, and wherein causing obfuscation of the at least the portion of the content comprises causing one or more of blurring of the at least a portion of the content or replacing the at least a portion of the content with a synthetic content portion.

\* \* \* \* \*